(12) United States Patent
Maeda et al.

(10) Patent No.: US 7,877,751 B2
(45) Date of Patent: Jan. 25, 2011

(54) MAINTAINING LEVEL HEAT EMISSION IN MULTIPROCESSOR BY RECTIFYING DISPATCH TABLE ASSIGNED WITH STATIC TASKS SCHEDULING USING ASSIGNED TASK PARAMETERS

(75) Inventors: Seiji Maeda, Kawasaki (JP); Tatsunori Kanai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1522 days.

(21) Appl. No.: 11/232,984

(22) Filed: Sep. 23, 2005

(65) Prior Publication Data

US 2006/0070073 A1 Mar. 30, 2006

(30) Foreign Application Priority Data

Sep. 30, 2004 (JP) .............................. 2004-288288

(51) Int. Cl.
G06F 9/46 (2006.01)
G06F 1/00 (2006.01)

(52) U.S. Cl. .................... 718/102; 718/100; 718/104; 718/105; 713/300

(58) Field of Classification Search ................. 718/100, 718/102, 104, 105; 713/300
See application file for complete search history.

(56) References Cited

U.S. PATENT DOCUMENTS 5,913,068 A * 6/1999 Matoba ....................... 713/322

(Continued)

FOREIGN PATENT DOCUMENTS

| EP | 1 182 552 A2 | 2/2002 |
| JP | 2004-240669 | 8/2004 |
| WO | WO 03/083693 A1 | 10/2003 |

OTHER PUBLICATIONS

Gerhard Fohler, et al., "Static Scheduling of Pipelined Periodic Tasks in Distributed Real-Time Systems", XP-010240868, Jun. 11, 1997, pp. 128-135.

(Continued)

Primary Examiner—Meng-Ai An
Assistant Examiner—Kenneth Tang
(74) Attorney, Agent, or Firm—Oblon, Spivak, McClelland, Maier & Neustadt, L.L.P.

(57) ABSTRACT

According to an aspect of the present invention, heat emissions of processors are level among the processors, and it is possible to suppress occurrence of stop of process due to overheating. The control IC assigns tasks to the processors, and thereafter rectifies an assignment result such that temperatures of the processors become almost level among the processors, on the basis of the temperatures of the processors obtained by temperature sensors. This structure enables level heat emissions among the processors, and suppresses occurrence of stop of process due to overheating.

4 Claims, 9 Drawing Sheets

U.S. PATENT DOCUMENTS

| | | | |
|---|---|---|---|
| 2004/0098718 A1 | 5/2004 | Yoshii et al. | |
| 2004/0268083 A1 | 12/2004 | Kanai et al. | |
| 2004/0268353 A1 | 12/2004 | Kanai et al. | |
| 2004/0268354 A1 | 12/2004 | Kanai et al. | |
| 2005/0066330 A1 | 3/2005 | Kanai et al. | |
| 2005/0060709 A1 | 5/2005 | Kanai et al. | |
| 2005/0108715 A1 | 5/2005 | Kanai et al. | |
| 2005/0278520 A1* | 12/2005 | Hirai et al. | 713/1 |
| 2006/0070073 A1 | 3/2006 | Maeda et al. | |
| 2007/0101227 A1* | 5/2007 | Ainspan et al. | 714/745 |

OTHER PUBLICATIONS

Chandrakant Patel, et al., "Energy Aware Grid: Global Workload Placement based on Energy Efficiency", HP Labs Technical Reports, XP-002351253, Dec. 6, 2002, pp. 1-10.

Tao Li, et al., "Run-time Modeling and Estimation of Operating System Power Consumption", Proceedings of the 2003 ACM SIGMETRICS, XP-002371350, Jun. 10-14, 2003, pp. 160-171.

U.S. Appl. No. 12/172,285, filed Jul. 14, 2008, Kanai, et al.

U.S. Appl. No. 11/233,026, filed Sep. 23, 2005, Maeda et al.

* cited by examiner

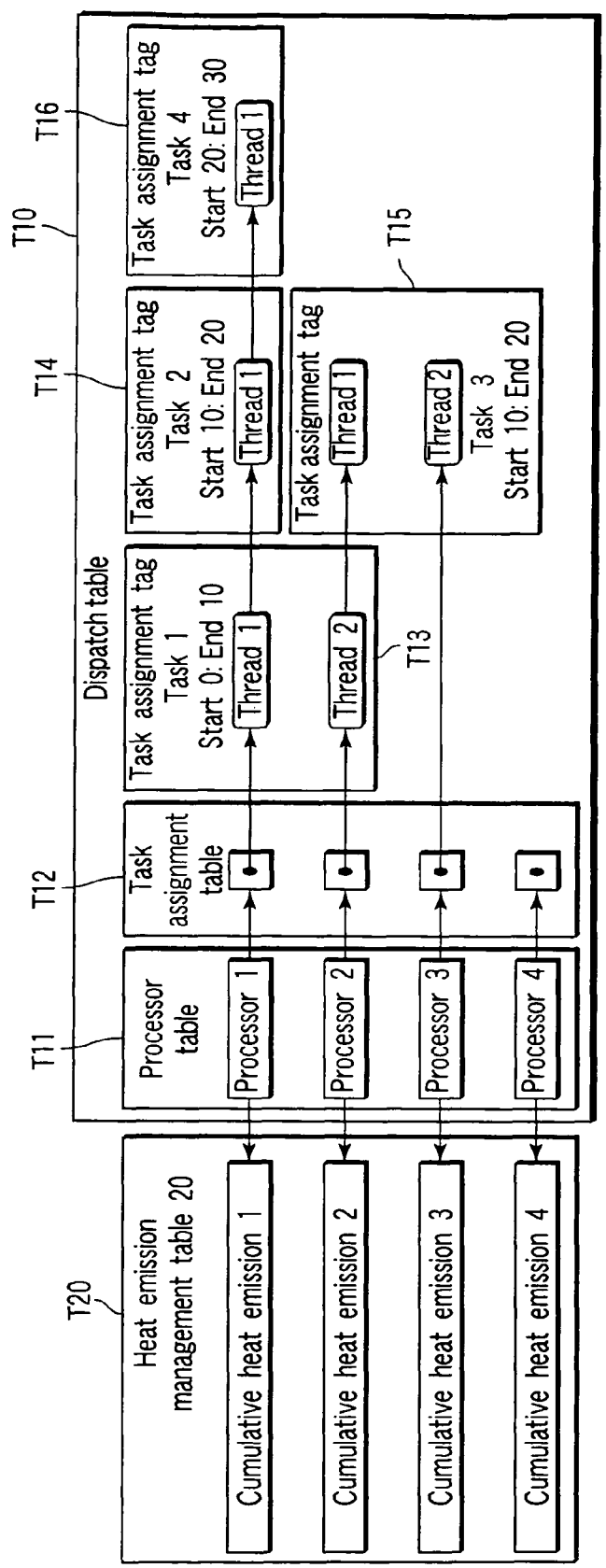
F I G. 5

MAINTAINING LEVEL HEAT EMISSION IN MULTIPROCESSOR BY RECTIFYING DISPATCH TABLE ASSIGNED WITH STATIC TASKS SCHEDULING USING ASSIGNED TASK PARAMETERS

CROSS-REFERENCE TO RELATED APPLICATIONS

This application is based upon and claims the benefit of priority from prior Japanese Patent Application No. 2004-288288, filed Sep. 30, 2004, the entire contents of which are incorporated herein by reference.

BACKGROUND OF THE INVENTION

1. Field of the Invention

This invention relates to a multiprocessor computer and a program which can assign tasks to a plurality of processors, in particular, a multiprocessor computer and a program which can level the heat emissions among the processors and suppress occurrence of stop of processing due to overheating.

2. Description of the Related Art

In the field of controlling the lines in factories and plants, widely used are computers performing control in synchronization with real time with which the object to be controlled operates. Such computers are equipped with hardware and software designed to achieve real-time processing.

Real-time processing is used for not only control processes in factories but also business information management processes and electronic commerce processes, and video process in multimedia processes.

As computers of this kind, used is a multiprocessor computer which simultaneously uses a plurality of processors, if a required processing power is higher than a processing power of a single processor.

In many multiprocessor computers, a plurality of processes are assigned to one processor to use not only real-time processing but also the processing capability of each processor effectively.

When performing a process, a multiprocessor computer divides the process into processing units, i.e., tasks, assigns processors of numbers necessary for executing respective tasks, and executes the tasks. If a task requires a plurality of processors, an execution unit to be processed on each processor may be called a thread. Further, if a task and threads forming the task are executed over a plurality of periods on a processor, each period may be called a job. For example, a task which requires two processors is periodically executed, the task is formed of two threads, the number of which is the same as the number of processors to be used, and each thread is periodically executed as a job.

If a plurality of tasks are executed in a multiprocessor computer, it is necessary to schedule to determine the execution order of the tasks. Between scheduling methods, there is a scheduling method called static scheduling in which the execution order of all jobs is determined prior to start of execution of tasks and the jobs thereof. The static scheduling methods can be classified into an offline scheduling method and an online scheduling method. The offline scheduling method schedules all the tasks before operation of the computer system. The online scheduling method performs scheduling when tasks to be actually executed are determined during operation of the system. Adopting the online scheduling method enables execution of only necessary tasks, in accordance with change in the object to be controlled during operation and user's request.

In the meantime, assigning jobs to processors which actually execute the jobs is called "dispatching". In the static scheduling method, scheduling is performed in advance, and dispatching is dynamically performed in execution of jobs.

A multiprocessor computer having the above structure has no particular problem under normal conditions. However, according to the inventors' study, such a multiprocessor computer performs scheduling and dispatching in consideration of only processing performance and real-time processing. Therefore, the heat emission becomes unlevel among the processors, and noise (the sound of a fan, etc.) caused by cooling of the heated processors increases. In the end, stop of processing may occur due to overheating.

BRIEF SUMMARY OF THE INVENTION

The object of the present invention is to provide a multiprocessor computer and a program which can level the heat emission among processors and suppress occurrence of stop of processing due to overheating.

According to a first aspect of the present invention, there is provided a multiprocessor computer to process a plurality of tasks with a plurality of processors connected to one another, comprising: a task assignment device configured to assign the tasks to the processors, such that values to be obtained by accumulating heat emission data items in the respective processors become almost level among the processors, each of the heat emission data items indicating a heat emission which is provided to a task and generated when the task is executed by at least one of the processors; a processor control device configured to control the processors such that the processors execute the corresponding tasks, on the basis of an assignment result obtained by the task assignment device.

According to a second aspect of the present invention, there is provided a multiprocessor computer to perform a plurality of tasks with a plurality of processors connected to one another, comprising: a plurality of temperature sensing devices configured to sense temperatures of the respective processors; a task assignment device configured to assign the tasks to the processors; an assignment result rectifying device configured to rectify an assignment result by the task assignment device such that the temperatures of the processors become almost level between the processors, on the basis of the sensed temperatures of the processors; and a processor control device configured to control the processors such that the processors execute the corresponding tasks, on the basis of a rectification result by the assignment result rectifying device.

Therefore, according to the first aspect of the present invention, when tasks are assigned to processors, the tasks are assigned to the processors such that values to be obtained by accumulating heat emission data items, each of which indicates a heat emission which is provided to a task and generated when the task is executed by at least one of the processors, in the respective processors become almost level between the processors. This structure enables a level heat emission among the processors, and suppresses occurrence of stop of process due to overheating.

Further, according to the second aspect of the present invention, after tasks are assigned to processors, an assignment result is rectified such that the temperatures of the processors become almost level with one another. This structure enables a level heat emission among the processors, and suppresses occurrence of stop of process due to overheating.

BRIEF DESCRIPTION OF THE SEVERAL VIEWS OF THE DRAWING

FIG. 5 is a schematic diagram for explaining tables in the embodiment.

DETAILED DESCRIPTION OF THE INVENTION

Embodiments of the present invention are explained below with reference to drawings. Although a multiprocessor computer including 4 processors is used in the following explanation, the number of processors may be any number being at least 2. Further, although the processors are formed on respective separate chips in the following embodiment, an on-chip multiprocessor may be used in which a plurality of processors are formed by one chip. Further, although in the following examples the multiprocessor is formed of one or more system controlling processor (a control IC 13 in FIG. 2) and a plurality of task processors (P1 to P4 in FIG. 2), the present invention is not limited to this structure, but a system controlling processor may also serve as a task processor. Furthermore, the system controlling processor and the task processors may be of different instruction set architectures. Processors to which threads are assigned are always task processors. Therefore, in the case of assigning threads, a task processing processor is simply referred to as "processor" hereinafter.

First Embodiment

Figure 1:
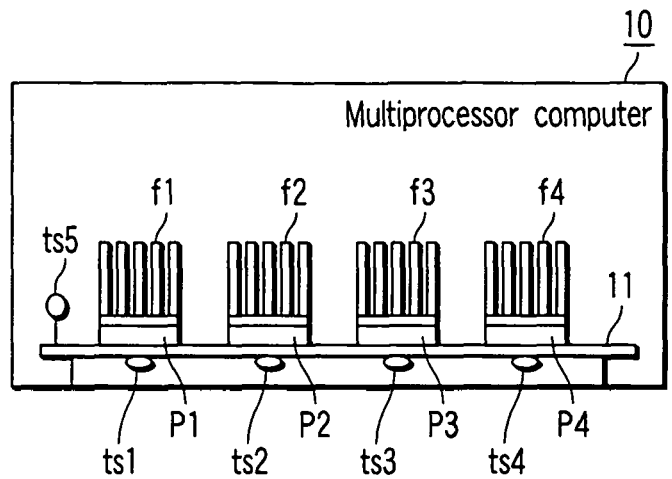
FIG. 1 is a schematic diagram illustrating a structure of a multiprocessor computer according to a first embodiment of the present invention.

FIG. 1 is a schematic diagram illustrating a structure of a multiprocessor computer according to a first embodiment of the present invention. In a multiprocessor computer 10, four processors P1 to P4 are mounted on a board 11.

Cooling fins f1 to f4 for cooling are attached to the processors P1 to P4, respectively. A cooling fan may be attached to each of the cooling fins f1 to f4. As a cooling system, a water cooling system may be adopted.

Under the board 11, temperature sensors ts1 to ts4 for measuring the temperatures of the respective processors are provided direct under the processors P1 to P4, respectively.

The temperature sensors ts1 to ts4 may be provided on upper surfaces of the processors P1 to P4, or may be included in the chips of the processors P1 to P4. In the case of using an on-chip multiprocessor, it is desirable that the temperature sensors ts1 to ts4 are included in a chip such that the sensors can measure the temperatures of the processors P1 to P4, respectively.

In a casing of the multiprocessor computer 10, a temperature sensor ts5 is stood on the board 11 to measure the temperature in the casing. The temperature sensor ts5 is preferably provided in a position in which the sensor ts5 is not influenced by heat-radiating members such as the processors P1 to P4. A thermocouple, for example, may be used as the temperature sensor ts5. Values measured by the temperature sensors ts1 to ts5 are subjected to analog-digital (A/D) conversion and the like so as to be received by a computer program.

Further, the temperature sensors ts1 to ts5 are constituent elements which are provided if temperature measurement is required, and may be omitted if temperature measurement is unnecessary.

Figure 2:
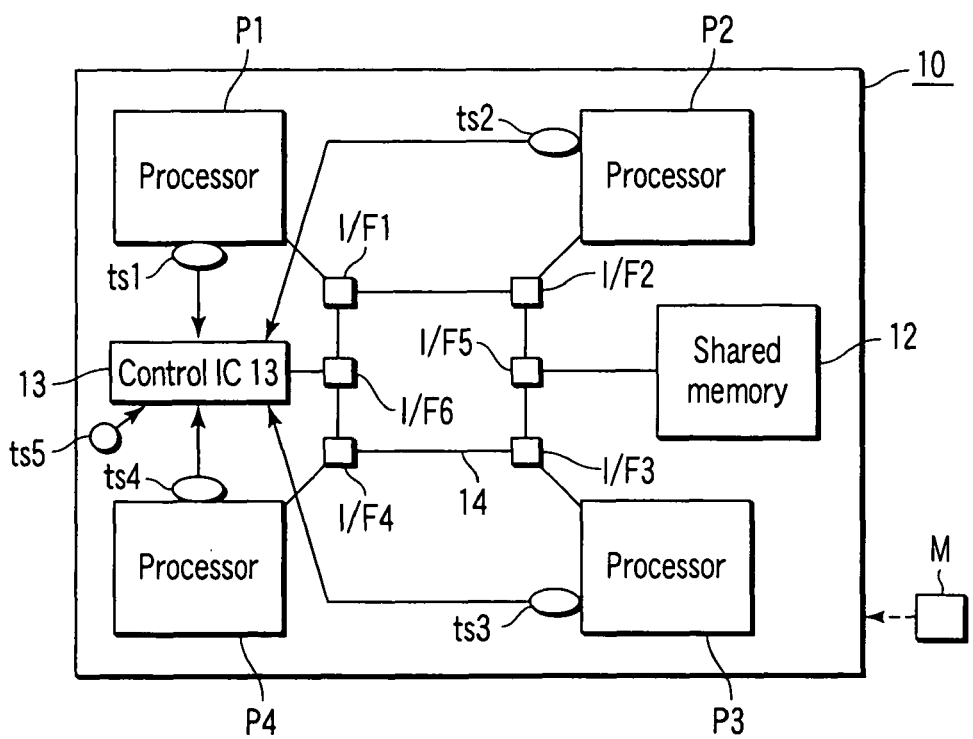
FIG. 2 is a schematic diagram illustrating a system structure in the embodiment.

Next, a system structure of the multiprocessor computer 10 having the above structure is explained. As shown in FIG. 2, the multiprocessor computer 10 has a structure in which the processors P1 to P4, a shared memory 12 and a control IC 13 are connected to a ring-shaped interconnect 14, via interfaces I/F1 to I/F6, respectively.

In this structure, the processors P1 to P4 correspond to the task processors described above, and are controlled by the control IC 13.

Figure 3:
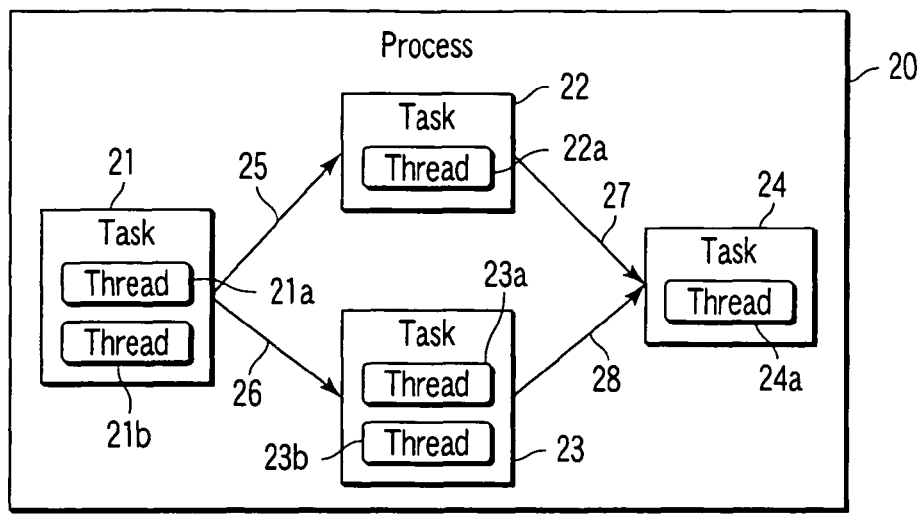
FIG. 3 is a schematic diagram for explaining concepts of a process, a task and a thread in the embodiment.
Figure 4:
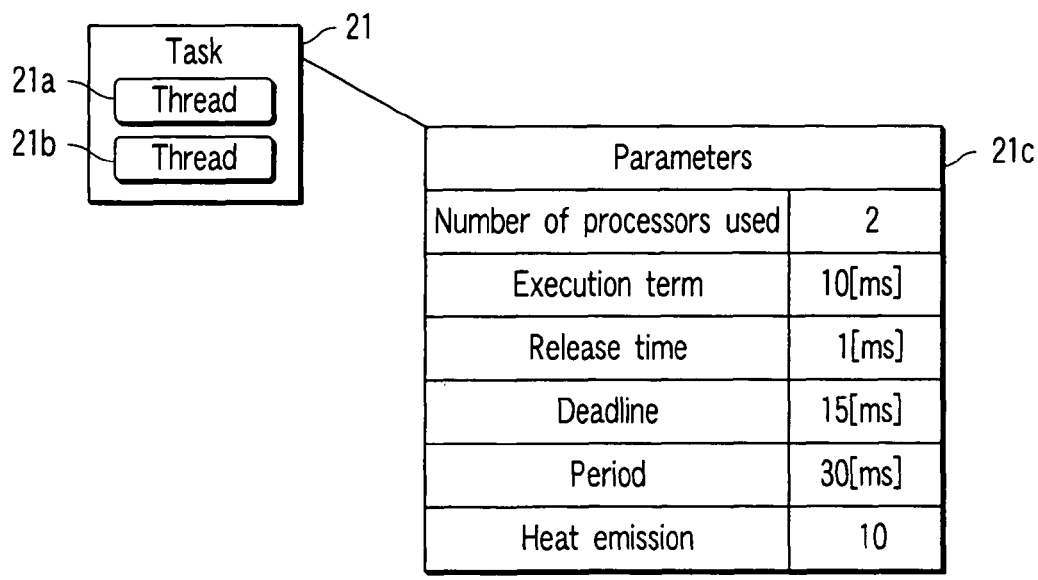
FIG. 4 is a schematic diagram for explaining parameters in the embodiment.
Figure 6:
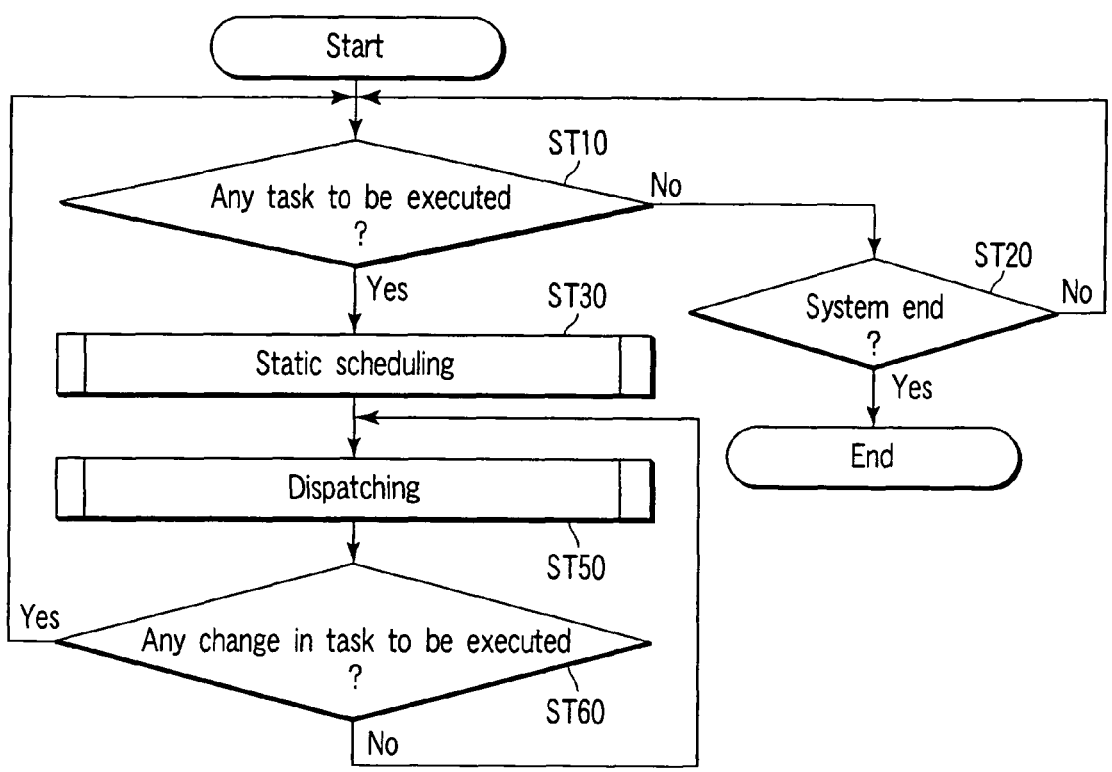
FIG. 6 is a flowchart for explaining operation in the embodiment.
Figure 7:
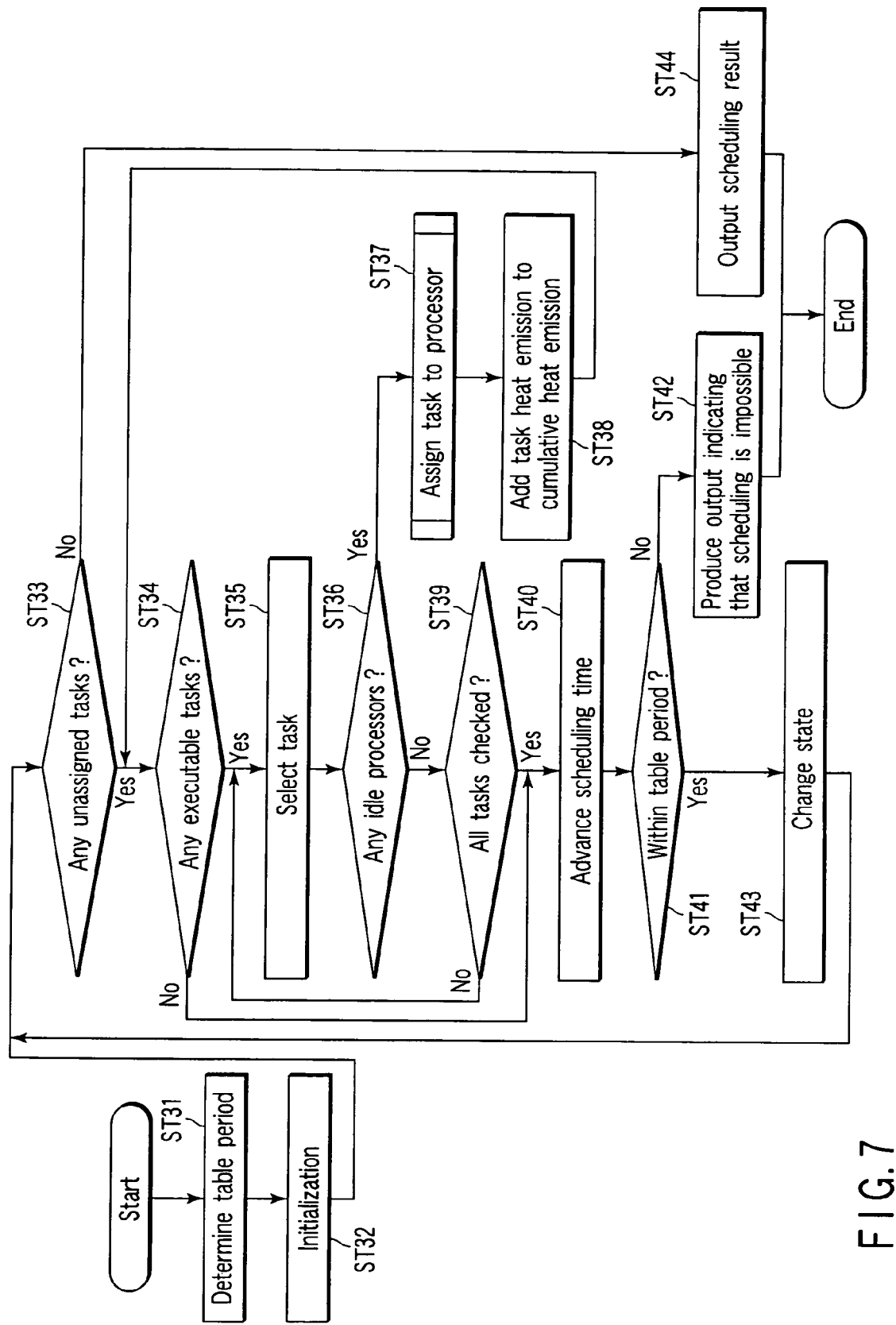
FIG. 7 is a flowchart for explaining operation in the embodiment.
Figure 8:
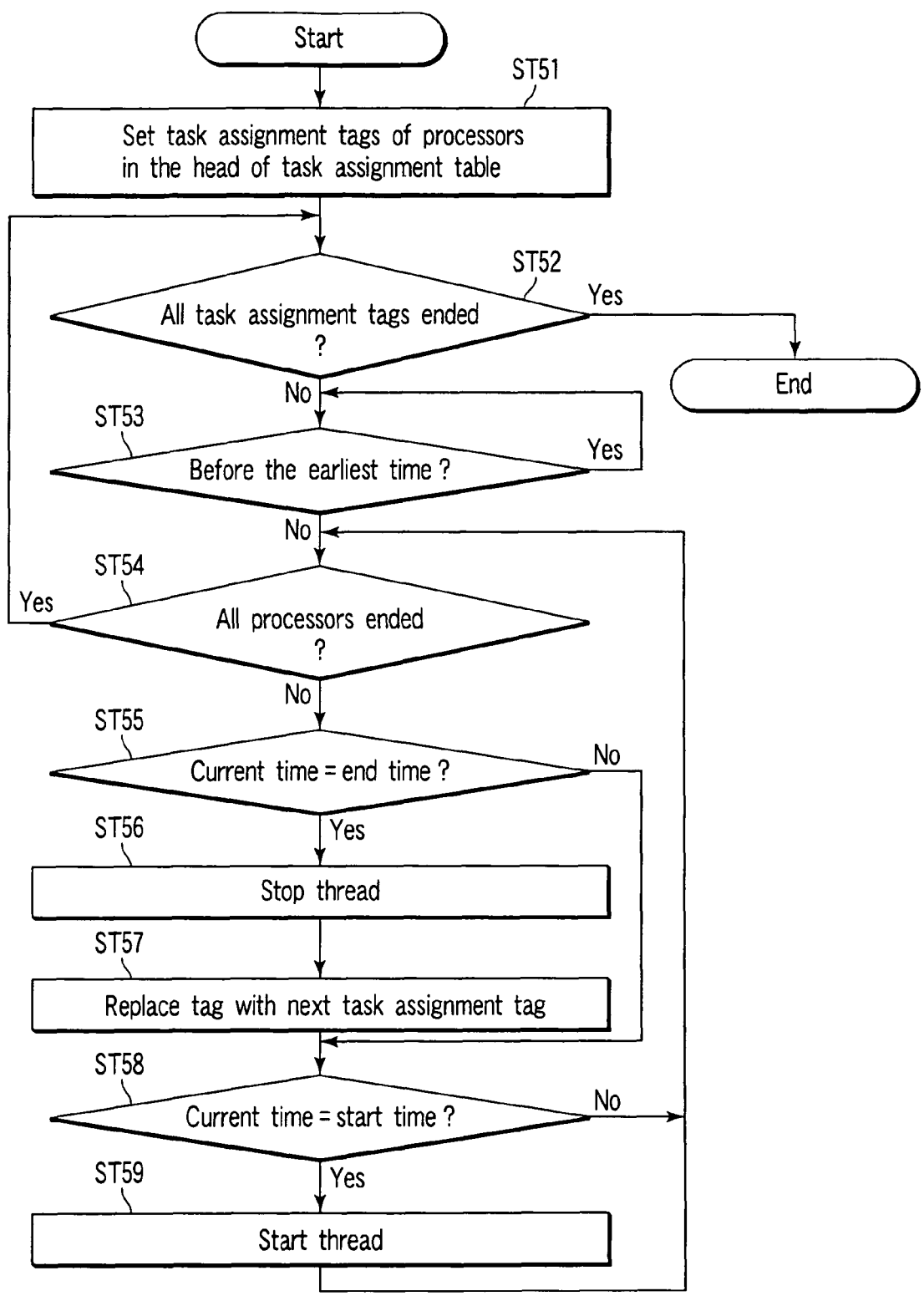
FIG. 8 is a flowchart for explaining operation in the embodiment.

The shared memory 12 is a memory which is readable and writable by the processors P1 to P4 and the control IC 13. For example, the shared memory 12 stores a processing 20 and a task 21 as shown in FIGS. 3 and 4 explained below, . . . , tables T10 and T20 shown in FIG. 5, scheduling programs as shown in FIGS. 6-8, and temperature measurement results by the temperature sensors ts1 to ts5, etc. Each of the processors P1 to P4 may have a memory instead of the shared memory 12, or each of the processors P1 to P4 may have a memory in addition to the shared memory 12. The scheduling programs are installed in advance in the multiprocessor computer 10 from a network or a storage medium M.

The control IC 13 corresponds to the system controlling processor described above, and performs static scheduling to assign tasks to the processors P1 to P4, on the basis of the scheduling programs stored in the shared memory 12 and the measurement results by the temperature sensors ts1 to ts5. The control IC 13 has a function of controlling the processors P1 to P4 such that the processors P1 to P4 execute respective corresponding tasks, on the basis of a dispatch table T10 (scheduling result) in the shared memory 12.

The scheduling is not always performed on the basis of temperature measurement results, but may be performed on the basis of a heat emission preset for each thread. In this case, the temperature sensors may be omitted since the temperature measurement results are unnecessary. As the static scheduling algorithm, a table-based scheduling algorithm can be used, for example. The table-based scheduling algorithm is a method in which dispatching of jobs are performed on the basis of a table indicating an execution order of jobs of a predetermined period of time.

The scheduling includes: referring to a heat emission data item for each task in assigning tasks to the processors P1 to P4 if a heat emission data item indicating a heat emission generated by execution of the task; assigning tasks to the processors P1 to P4 on the basis of the reference result such that the cumulative values of the heat emission data items are almost level between the processors, and preparing a dispatch table (processor assignment table) T10 which shows the assignment result; and writing the dispatch table T10 in the shared memory 12.

The interfaces I/F1 to I/F6 are connected to the interconnect 14 which is formed in a ring shape, and enable data transmission along the interconnect 14. As long as mutual data transmission is possible, the interconnect does not necessarily have such a ring shape. For example, the processors P1 to P4 and the shared memory 12 may be connected by using one or more buses. As another structure, a processor may be directly connected to all the other processors. The multiprocessor computer 10 can adopt various connecting methods as a method of connecting processors, such as bus type, array type, and a ring type.

Next, the concepts of processes, tasks and threads which are executed by the processors P1 to P4 are explained, with reference to FIG. 3. The multiprocessor computer 10 executes one or more processes 20. A process 20 comprises a plurality of tasks 21 to 24, for example. Each of the tasks 21 to 24 is formed of threads of a number equal to the number of processors to be used. For example, a task 21 which requires 2 processors comprises two threads 21a and 21b. The other tasks are formed as follows. A task 22 is formed of a thread 22a. A task 23 is formed of threads 23a and 23b. A task 24 is formed of a thread 24a.

The thread(s) included in each task is(are) assigned to the respective processors, and each thread is executed as a job. For example, if the task 21 is periodically executed, processors are periodically assigned to the threads 21a and 21b, and each thread is periodically executed as a job.

The process may include controlling progress of the process by precedence constraints which designate the execution order of tasks. For example, in the process 20, a precedence constraint 25 designates the task 21 to be executed prior to the task 22, and a precedence constraint 26 designates the task 21 to be executed prior to the task 23. The tasks 22 and 23 are executed after end of the task 21, on the basis of the designations by the precedence constraints 25 and 26. Further, in the process 20, a precedence constraint 27 designates the task 22 to be executed prior to the task 24, and a precedence constraint 28 designates the task 23 to be executed prior to the task 24. The task 24 is executed after ends of the tasks 22 and 23, on the basis of the designations by the precedence constraints 27 and 28. If it is unnecessary to designate the processing order, the execution order of the tasks may not be designated by precedence constraints.

Next, FIG. 4 shows an example of parameters assigned to real-time tasks which are executed in real time. For example, parameters 21c are assigned to the task 21 in advance. The parameters include the number of processors to be used, execution term (length of the processing time), release time (time when processing can be started), deadline (processing completion time), period, and heat emission. If the parameters include the period, the execution term, the release time, and the deadline mean the execution term, release time, and deadline, respectively, in a cycle of a job which is periodically executed. The heat emission is data indicating a heat emission generated if a processor executes the task 21 for the execution term. If a task includes a plurality of threads, the heat emission can be designated for each thread.

Next, explained are the dispatch table T10 which shows the assignment result of tasks, and a heat emission management table T20 to manage heat emissions of the respective processors, with reference to FIG. 5.

The dispatch table T10 shows the result of assigning the tasks shown in FIG. 3 to the processors P1 to P4. The dispatch table T10 comprises a processor table T11, a task assignment table T12, and task assignment tags T13 to T16.

The processor table 11 is a table which holds assignment IDs of the processors P1 to P4 such that the IDs are connected to first to fourth assignment IDs in the task assignment table T12, respectively.

In the task assignment table T12, the assignment IDs are connected to corresponding task assignment tags which are arranged in the order of the starting time. In the time from 0 to 10 ms in each period, a thread 1 of a task 1 is assigned to the processor P1, and a thread 2 of the task 1 is assigned to the processor P2, as shown in the task assignment tag T13. In the time from 10 to 20 ms, a thread 1 of a task 2 is assigned to the processor P1 as shown in the task assignment tag T14, and a thread 1 of a task 3 is assigned to the processor P2 and a thread 2 of the task 3 is assigned to the processor P3 as shown in the task assignment tag T15. In the time from 20 to 30 ms, a thread 1 of a task 4 is assigned to the processor P1.

The dispatch table T10 may be of any form, as long as it can associate processors with threads to be executed.

The heat emission management table T20 is a table which stores a value (cumulative heat emission) obtained by accumulating heat emissions of assigned tasks for each ID of the processors P1, P2, . . . , P4. Although this embodiment shows an example in which the heat emission management table T20 is connected to the processor table T10, the present invention is not limited to this structure, but may have a structure in which the heat emission management table T20 holds the IDs of the processors and the cumulative heat emissions in association.

Next, the operation of the multiprocessor computer having the above structure is explained with reference to the flowcharts of FIGS. 6 to 8. The operation of the whole computer is explained first, and then the static scheduling operation and the dispatching operation are successively detailed.

(Operation of Whole Computer)

After the system is started, the control IC 13 checks whether there are any tasks to be executed in the system (ST10), as shown in FIG. 6. If there are no tasks to be executed, the control IC 13 checks whether the system is to be ended (ST20). If there are any tasks to be executed in the step ST10, the control IC 13 performs static scheduling in view of the heat emissions (ST30), such that the cumulative values of the processors P1 to P4 obtained by accumulating heat emission data items provided to the respective tasks are almost level. The static scheduling is detailed below.

After completion of the scheduling, the control IC 13 performs dispatching of threads (ST50), on the basis of the dispatch table T10 showing the scheduling results. The control IC 13 checks whether there is any change in tasks to be executed after dispatching (ST60), and continues dispatching if there is no change. If there is any change, it returns to the step ST10.

(ST30: Static Scheduling)

As shown in FIG. 7, the control IC 13 determines a table period in view of all the tasks to be executed (ST31). The table period may be set to one specific value in advance. As another example, the least common multiple of the periods of all the tasks may be used as the table period. In this case, each of the tasks is replicated by the number of times obtained by dividing the table period by the corresponding task period.

Next, the control IC 13 initializes the scheduling time being the time within the table period and the heat emissions of the processors (ST32). Then, the control IC 13 determines which tasks the processors are assigned at the scheduling time.

First, the control IC 13 checks whether there is any task which any processor is not assigned (ST33). If there are no tasks not having assigned to the processors, it goes to step ST44, outputs the scheduling result, and ends the scheduling.

If there are any tasks not having assigned to the processors, the control IC 13 checks whether the tasks include any tasks which are executable at the present scheduling time (ST34). If the release time of all the tasks is 0 or there are no precedence constraints, all the unassigned tasks are executable. In such a case, this step can be omitted.

If there are executable tasks, one task is selected from the executable tasks (ST35). Then, the control IC 13 checks whether there are idle processors as many as the number of processors to be used for the selected task (ST36). If there are sufficient idle processors, the control IC 13 refers to the heat emission data item of each task and the heat emission management table T20, and assigns processors the task such that the cumulative heat emissions of the processors P1 to P4 are level among the processors P1 to P4 (ST37).

In this assignment, if there are idle processors of the number equal to the number of processors to be used for the selected task, all the idle processors are assigned the task. If there are idle processors more than processors to be used for the task, processors of less cumulative heat emissions are assigned the task with higher priority. Such assignment levels the cumulative heat emissions of the processors P1 to P4 with one another, and avoids stop of the system due to overheating of a specific processor. Further, the control IC 13 prepares a task assignment table T12 showing the assignment result and write the table in the shared memory T12.

After completion of step ST37, the heat emission of the assigned task (selected task) is added to the cumulative heat emission of the corresponding processor in the heat emission management table T20 (ST38), to update the cumulative heat emission of the corresponding processor. Parameters concerning heat emissions provided to each task or each thread included in a task are used for calculation of the cumulative heat emission of the processor. For example, a value obtained by executing the task on the actual system in advance and measuring the actual heat emission of the task may be used as the parameters of the heat emission. As another example, the result of computer simulation using a temperature model may be used as the parameters.

Further, as an indicator for heat generation by the processors, it is possible to use transient temperature change of the processors instead of the cumulative heat emissions of the processors. It is possible to predict a processor temperature more precisely than the case of using simple cumulative heat emissions, by performing unsteady heat conduction simulation using a temperature model on the basis of parameters concerning the heat emissions provided to each task or each thread included in a task After completion of the step ST38, the control IC 13 returns to the step ST34 to process other executable tasks. If there are no idle processors, the control IC 13 checks whether all the executable tasks have been checked (ST39). If all the executable tasks have not yet been checked, the control IC 13 returns to the step ST35 (selection of task), and selects another executable task.

If there are no executable tasks in the step ST34 or all the executable tasks have been checked in the step ST39, the scheduling time is advanced to the time at which the next event occurs (ST40). The event occurrence time is time when the number of idle processors changes, such as the completion time of the execution term of the current processor-assigned task, and the release time of an unassigned task.

If the control IC 13 determines that the scheduling result is beyond the table period as a result of advancing the scheduling time (ST41), the control IC 13 produces an output indicating that scheduling is impossible (ST42), and ends the scheduling. In this case, the control IC 13 may perform scheduling again by changing the order of task selection in the step ST35.

When determining whether the scheduling result is beyond the table period, it can be determined by checking whether the current scheduling time is greater than the table period, for example. Further, in the case where the current scheduling time fall within the table period, it may be determined whether the succeeding scheduling is not ended within the table period, on the basis of unassigned tasks. For example, if the processing capacity necessary for execution of the unassigned tasks is greater than the processing capacity in the rest of the table period, it is possible to determine at the point in time that scheduling is impossible.

If it is determined in the step ST41 that the scheduling result is not beyond the table period, the control IC 13 changes the states of the processors and processor-unassigned tasks, which are changed due to the event occurring at the time (ST43), and starts the process again from the step ST33.

(ST50: Dispatching for One Period)

As shown in FIG. 8, the control IC 13 sets the current task assignment tags of the processors P1 to P4 as task assignment tags connected to the head of the task assignment table T12 (ST51). Next, the control IC 13 checks whether process for all the task assignment tags has been completed (ST52). If completed, the control IC 13 ends dispatching for one period. If not completed, the control IC 13 waits until the earliest time after the current time, of the starting times and the end times of all the task assignment tags (ST53).

When the earliest time has come, the control IC 13 performs the following processing to all the processors P1 to P4 (ST54).

First, the control IC 13 checks whether the end time of the current task assignment tag is equal to the current time (ST55). If equal, the control IC 13 stops the thread being executed (ST56), and replaces the current task assignment tag with the next task assignment tag (ST57).

Next, the control IC 13 checks whether the start time of the current task assignment tag is equal to the current time (ST58). If equal, the control IC 13 start execution of the thread designated by the task assignment tag (ST59). After processes of all the processors are ended, the control IC 13 returns to the step ST52.

As described above, according to this embodiment, when tasks are assigned to the processors, the control IC 13 assigns tasks to the processors such that the values obtained by accumulating the heat emission data items provided to the respective tasks in the respective processors are almost level between the processors. Therefore, the processors are level in the heat emission, and it is possible to suppress stop of processes due to overheating.

Second Embodiment

Next, a multiprocessor computer according to a second embodiment of the present invention is explained with reference to FIGS. 1 to 5.

The second embodiment is a modification of the first embodiment. The second embodiment does not perform static scheduling in view of cumulative heat emissions, but performs normal static scheduling and thereafter corrects a scheduling result in view of the processor temperatures.

Figure 9:
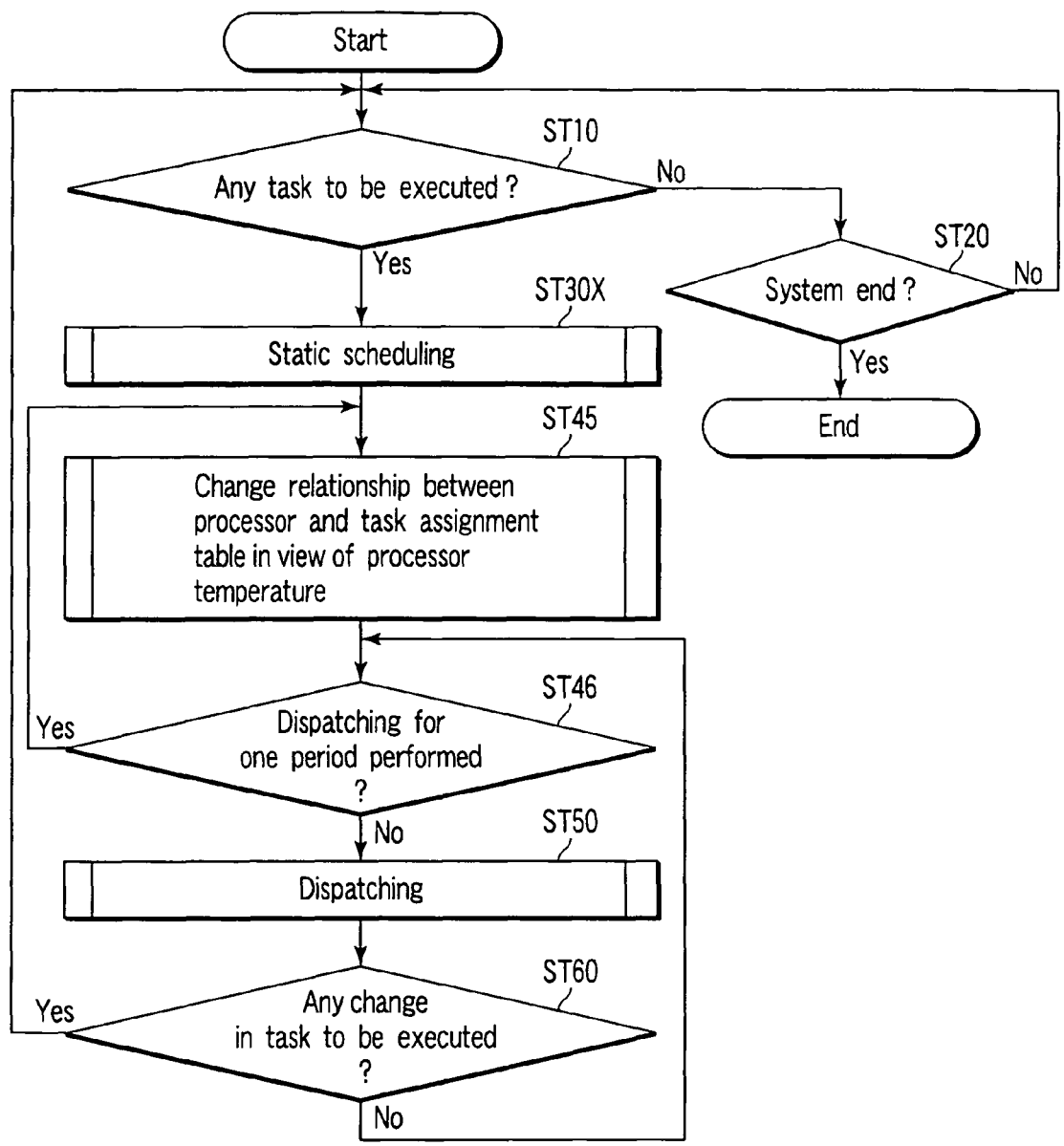
FIG. 9 is a flowchart for explaining operation of a multiprocessor computer according to a second embodiment of the present invention.
Figure 10:
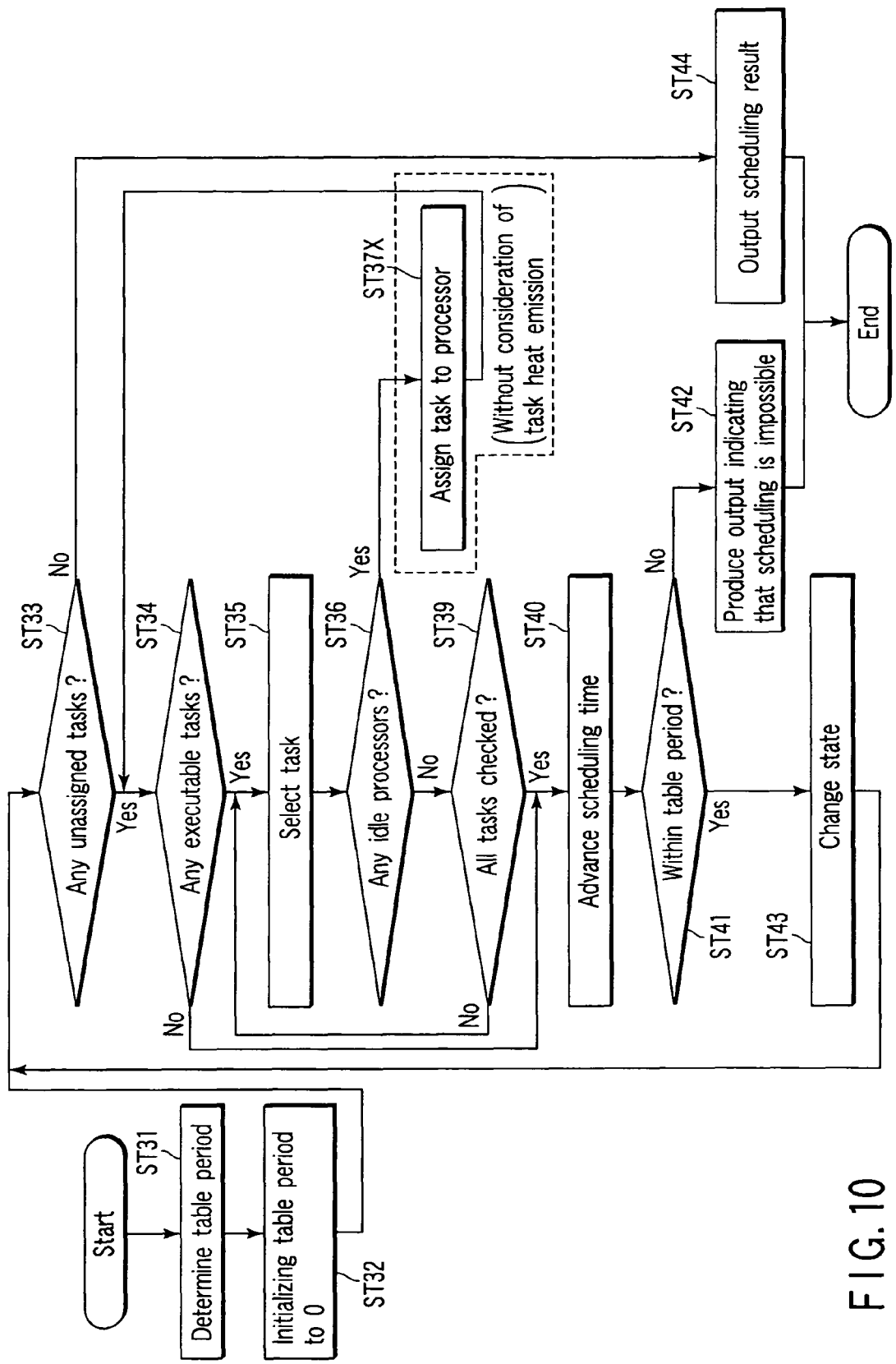
FIG. 10 is a flowchart for explaining operation in the second embodiment.

In conformity with this system, the control IC 13 performs operations shown in FIGS. 9 and 10, instead of the operations shown in FIGS. 6 and 7.

(Operation of Whole Computer)

After the system is started, the control IC 13 checks whether there are any tasks to be executed in the system (ST10). If there are no tasks to be executed, the control IC 13 checks whether the system is to be ended (ST20). If there are any tasks to be executed in the step ST10, the control IC 13 performs static scheduling without consideration of task heat emissions (ST30X). This static scheduling is different from that shown in FIG. 7 in that the task heat emissions are not considered in step ST 37X and it has no step ST38, as shown in FIG. 10.

After completion of scheduling, the control IC 13 rectifies the dispatch table T10 on the basis of the processor temperatures obtained by the temperature sensors ts1 to ts4 and the scheduling result, such that the processor temperatures become almost level with one another. Specifically, in the dispatch table T10, the control IC 13 changes the relationship between the IDs of the processors P1 to P4 in the processor table T11 and the respective assigned IDs in the task assignment table T12 (ST45).

As a standard used for changing the relationship, the correspondences among the processors and the task assignment table can be simply shifted one by one. This example will be detailed in a third embodiment below. As another example, it is possible to preferentially associate a task assignment table having a higher total heat emission with a processor of the lower temperature. Further, it is possible to perform unsteady heat conduction simulation with a temperature model, using the current processor temperatures and the task assignment table, and adopt a combination of the processor and the task assignment table which incurs the lowest processor temperature.

After completion of the step ST45, the control IC 13 checks whether there are any changes in the tasks to be executed after dispatching (ST60). If there are no changes, the control IC 13 continues dispatching. If there are any changes, the control IC 13 returns to the step ST10 to check whether there are any tasks to be executed.

As described above, according to the second embodiment, the control IC 13 assigns tasks to the processors, and thereafter rectifies the assignment result such that the temperatures of the processors P1 to P4 become almost level with one another. Therefore, it is possible to level the heat emissions between the processors, and suppress occurrence of stop of processing due to overheating.

In the flowchart of FIG. 9, dispatching for one period is performed at a time and then the change the relationship between the processors P1 to P4 and the task assignment table T12. However, the present invention is not limited to it, but assigned IDs in the task assignment table T12 can also be exchanged between the processors, if threads executed simultaneously on a plurality of processors are exchanged, or if a thread executed on at least one processor is shifted to an idle processor.

Third Embodiment

Next, a multiprocessor computer according to a third embodiment of the present invention is explained with reference to FIGS. 1 to 5 and FIG. 9.

This embodiment is a specific example of the second embodiment. In the third embodiment, relative positions of the processors are held constant, when the scheduling result is rectified in the step ST45 in consideration of the processor temperatures.

Figure 11:
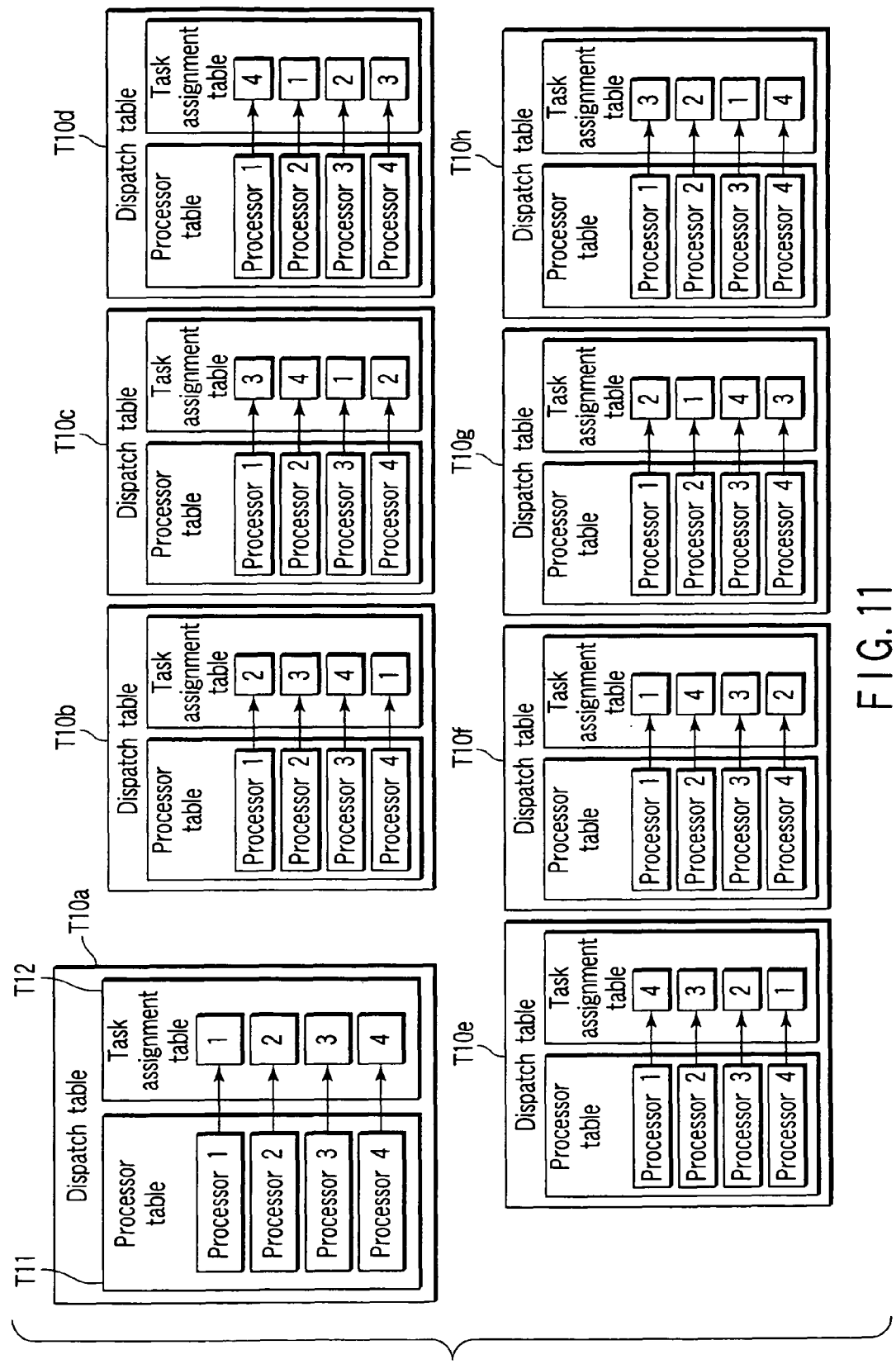
FIG. 11 is a schematic diagram for explaining a method of changing dispatch tables in a third embodiment of the present invention.

FIG. 11 illustrates a method of changing the relationship between processors and a task assignment table in view of a ring-shaped system.

If the interconnect of the multiprocessor is the ring-shaped system, in a pair of threads which perform data exchange, the data transmission capacity changes together with change of the relative positions of the processors which execute the threads. As a result, the behavior of the application formed of the threads become unstable, and a failure may occur according to circumstances. Therefore, it is desirable to level the heat emissions while the relative positions of the processors executing the threads are maintained.

Suppose that the current relationship between the processors and the task assignment table is shown by the dispatch table T10a comprising the processor table T11 and the task assignment table T12. If the correspondence between the processors and the task assignment table is changed with the relative positions of the processors maintained, the dispatch table T10a can be changed to 7 types of dispatch tables T10b to T10h.

The control IC 13 predicts change in temperatures of the processors, by using the current processor temperatures and the correspondence between the processor table T11 and the task assignment table T12, with respect to all the dispatch tables T10b and T10h in addition to the original dispatch table T10a. Based on the prediction result, the control IC 13 selects a dispatch table which can level the heat emissions most, from all the dispatch tables T10a to T10h.

The change in temperatures of the processors can be predicted by using, for example, the processor temperatures and the total heat emission of the tasks for each assignment ID of the task assignment table T12.

The processor temperatures are measured by the temperature sensors ts1 to ts4 attached to the processors P1 to P4, for example. As another example, cumulative heat emissions of the processors may be used instead of the processor temperatures, on the basis of parameters relating to the heat emissions provided to the respective tasks or threads forming a task.

The total heat emission of each assignment ID can be calculated based on parameters relating to the heat emissions provided to the respective tasks or thread forming a task. As another example, it is possible to use the temperature change which was actually measured when the tasks were executed before.

Further, as a method of predicting temperature change, it is possible to use a method of performing unsteady heat conduction simulation using a temperature model on the basis of the current processor temperatures and the total heat emission of the task assignment table T12, and thereby predicting the processor temperatures more precisely.

In either method, the control IC 13 predicts change in temperatures of the processors and selects, on the basis of the prediction results, a dispatch table which can level the heat emissions most, from all the dispatch tables T10a to T10h holding the relative positions of the processors P1 to P4. This structure enables the control IC 13 to hold the relative positions of the processors P1 to P4 constant, when the scheduling result is rectified in the step ST45.

As described above, the third embodiment has the structure of holding the relative positions of the processors constant when the scheduling result is rectified in the step ST45. This structure prevents change in the data transmission capacity, and stabilizes the behavior of applications, in addition to the advantageous effects of the second embodiment. Note that the techniques described in the above-described respective embodiments are stored as programs which can be executed by computers in storage media such as magnetic disks (floppy (registered trademark) disks, hard disks, and the like), optical disks (CD-ROM/DVD and the like), optical magnetic disks (MO), semiconductor memories, and the like, and can be distributed.

Further, as the storage media, storage media which can store programs therein and out which computers can read may have any form of the storing system.

Further, middle ware (MW) or the like such as operating system (OS), database management software, network software, or the like, which is working on a computer on the basis of an instruction of the program installed in the computer from the storage medium may execute some of the respective processes for realizing the present embodiment.

Moreover, the storage media in the present invention are not limited to media independent of the computer, and storage media in which a program transmitted via LAN, Internet, or the like is downloaded, and stored or temporarily stored are included therein.

Further, the storage medium is not limited to one, and a case where the processes in the present embodiment are executed from a plurality of media is included in the storage medium in the present invention, and the medium configuration may be any configuration.

Note that, the computer in the present invention is to execute the respective processes in the present embodiment on the basis of the program stored in the storage medium, and may be any configuration of an apparatus formed from one such as a personal computer, a system in which a plurality of apparatuses are connected through a network, and the like.

Note that the computer in the present invention is not limited to a personal computer, and includes an arithmetic processing device, a microcomputer, and the like included information processing equipment, and is general term for equipment/apparatus which can realize the functions of the present invention by the program.

Note that the present invention is not limited to the above-described embodiments as are, and structural requirements can be modified and materialized within a range which does not deviate from the gist of the present invention at the practical phase. Further, various inventions can be formed due to the plurality of structural requirements which have been disclosed in the above-described embodiments being appropriately combined. For example, several structural requirements may be eliminated from all of the structural requirements shown in the embodiments. Moreover, structural requirements over different embodiments may be appropriately combined.

What is claimed is:

1. A multiprocessor computer to perform a plurality of tasks with a plurality of processors connected to one another, the multiprocessor computer comprising:

a control integrated circuit (IC) which performs a static scheduling to assign the tasks to the processors, on the basis of parameters assigned to the tasks in advance, such that values obtained by accumulating heat emission data items in the respective processors become substantially level among the processors, and controls the processors such that the processors execute the corresponding tasks, on the basis of an assignment result, the static scheduling determining execution order of all tasks prior to start of execution of any of the tasks, each of the heat emission data items indicating a heat emission, the heat emission data items of the assigned tasks being accumulated by the control IC, each heat emission data item being generated when a corresponding task is executed by at least one of the processors, and the parameters including a number of processors to be used, an execution term for each task, a release time when processing can be started, a deadline which is processing completion time, period, and heat emission associated with a corresponding task, the parameters being preset for each task; and a memory connected to the processors and the control IC; wherein the static scheduling includes preparing a dispatch table indicating the assignment result, the assignment result being connected in the order of the release time for each processor; and writing the dispatch table in the memory.

2. A computer-readable storage medium storing therein a program which, when executed by a multiprocessor computer, causes the multiprocessor computer to execute a method for executing a plurality of tasks with a plurality of processors and a memory connected to one another, the method comprising:

performing a static scheduling to assign the tasks to the processors, on the basis of parameters assigned to the tasks in advance, such that values obtained by accumulating heat emission data items in the respective processors become substantially level among the processors, the static scheduling determining execution order of all tasks prior to start of execution of any of the tasks, each of the heat emission data items indicating a heat emission, the heat emission data items of the assigned tasks being accumulated by the computer, each heat emission data item being generated when a corresponding task is executed by at least one of the processors, and the parameters including a number of processors to be used, an execution term for each task, a release time when processing can be started, a deadline which is processing completion time, period, and heat emission associated with a corresponding task, the parameters being preset for each task;

preparing a dispatch table based on the assignment of the tasks to the processors, the assignment being connected in the order of the release time for each processor;

writing the dispatch table in the memory; and controlling the processors to execute the corresponding tasks, on the basis of the dispatch table in the memory.

3. A multiprocessor computer to perform a plurality of tasks with a plurality of processors connected to one another, comprising:

a plurality of temperature sensing devices which sense temperatures of the respective processors;

a control IC which performs a static scheduling to assign the tasks to the processors, on the basis of parameters assigned to the tasks in advance, rectifies an assignment result, on the basis of the sensed temperatures of the processors, such that the temperatures of the processors become substantially level among the processors, and controls the processors such that the processors execute the corresponding tasks, on the basis of a rectification result, the rectification result determining execution order of all tasks prior to start of execution of any of the tasks, the parameters including a number of processors to be used, an execution term for each task, a release time when processing can be started, a deadline which is processing completion time, heat emission associated with a corresponding task, and period; and a memory connected to the processors and the control IC; wherein the static scheduling includes preparing a dispatch table indicating the assignment result, the assignment result being connected in the order of the release time for each processor; and writing the dispatch table in the memory.

4. A computer-readable storage medium storing therein a program which, when executed by a multiprocessor computer comprising a plurality of temperature sensing devices which sense temperatures of the respective processors, causes the multiprocessor computer to execute a method for executing a plurality of tasks with a plurality of processors and a memory connected to one another, the method comprising:

performing a static scheduling to assign the tasks to the processors, on the basis of parameters assigned to the tasks in advance, and prepare a dispatch table indicating an assignment result, the static scheduling determining execution order of all tasks prior to start of execution of any of the tasks, the parameters including a number of processors to be used, an execution term for each task, a release time when processing can be started, a deadline which is processing completion time, heat emission associated with a corresponding task, and period, and the assignment result being connected in the order of the release time for each processor;

writing the dispatch table in the memory;

rectifying the dispatch table in the memory, on the basis of the sensed temperatures of the processors, such that the temperatures of the processors become substantially level among the processors; and controlling the processors such that the processors execute the corresponding tasks, on the basis of a rectification result.

* * * * *